US010424949B2

(12) United States Patent
Chen et al.

(10) Patent No.: US 10,424,949 B2
(45) Date of Patent: Sep. 24, 2019

(54) CHARGE CABINET AND STORAGE DEVICE THEREOF

(71) Applicant: AVer Information Inc., New Taipei (TW)

(72) Inventors: Shu-Chen Chen, New Taipei (TW); Hui-Lun Hung, New Taipei (TW); Christopher Yen, New Taipei (TW); Jay Paul Lyons, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 640 days.

(21) Appl. No.: 15/097,863

(22) Filed: Apr. 13, 2016

(65) Prior Publication Data

US 2017/0155260 A1    Jun. 1, 2017

(30) Foreign Application Priority Data

Nov. 27, 2015    (TW) .............................. 104139705 A (51) Int. Cl.
*H02J 7/00* (2006.01)
*A47B 97/00* (2006.01)
(Continued)

(52) U.S. Cl.
CPC ............ *H02J 7/0027* (2013.01); *A47B 81/00* (2013.01); *A47B 96/04* (2013.01); *A47B 97/00* (2013.01);
(Continued)

(58) Field of Classification Search
CPC ....... H02J 7/0027; H02J 7/0044; A47B 81/00; A47B 96/04; A47B 97/00; A47B 57/588;
(Continued)

(56) References Cited

U.S. PATENT DOCUMENTS

2003/0190036 A1* 10/2003 Mandoza ............... H04Q 1/064
379/327
2004/0012921 A1*  1/2004 Hidaka ................ G11B 33/022
361/679.32
(Continued)

FOREIGN PATENT DOCUMENTS

| CN | 103163994 A | 6/2013 |
| CN | 104881101 A | 9/2015 |
| JP | 2008-251256 A | 10/2008 |
| JP | 2011-187440 A | 9/2011 |
| JP | 2012-174411 A | 9/2012 |

(Continued)

*Primary Examiner* — Richard Isla
*Assistant Examiner* — Dung V Bui
(74) *Attorney, Agent, or Firm* — Muncy, Geissler, Olds & Lowe, P.C.

(57) ABSTRACT

A storage device includes a base and a plurality of wire management modules. Each of the wire management modules includes a partition and a pivotal member. The partition is disposed to the base and has a supporting surface and a wire management groove. The supporting surface is located at the partition. The wire management groove is located at the supporting surface for accommodating wire. The pivotal member includes a fastening part and a pivotal part. The pivotal part is pivoted on the partition for a fastening position and a releasing position. When the pivotal member is at the fastening position, the fastening part covers the supporting surface for fastening wire between the surface and the fastening part. When the pivotal member is at the releasing position, the fastening part is spaced apart from the surface for releasing wire. The partitions and the base together form accommodation spaces.

18 Claims, 10 Drawing Sheets

(51) Int. Cl.
*A47B 81/00* (2006.01)
*A47B 96/04* (2006.01)
*A47B 57/58* (2006.01)

(52) U.S. Cl.
CPC ........... *H02J 7/0044* (2013.01); *A47B 57/588* (2013.01); *A47B 2097/003* (2013.01)

(58) Field of Classification Search
CPC .......... B65D 25/04; B65D 25/06; B65D 5/48; B65D 5/48024; G02B 6/4439; G02B 6/444; G02B 6/4441; G02B 6/4442; G02B 6/4444; G02B 6/4445; G02B 6/4446; G02B 6/4447; G02B 6/4448; G02B 6/445; G02B 6/4451; G02B 6/4452; H05K 5/0247; H05K 7/1417; H05K 7/1447; H05K 7/1448; H05K 7/1449; H05K 7/1451; H05K 7/1491
USPC ........ 320/107; 206/576, 320, 701, 702, 722, 206/725, 726; 220/532, 533, 534, 549, 220/550, 529; 211/183, 184; 312/223.6; 385/135
See application file for complete search history.

(56) References Cited

U.S. PATENT DOCUMENTS

| | | | |
|---|---|---|---|
| 2008/0241687 A1 | 10/2008 | Ishii et al. | |
| 2012/0229967 A1* | 9/2012 | Zhou | H01R 13/72 361/679.01 |
| 2012/0308881 A1 | 12/2012 | Tokuda et al. | |
| 2013/0063073 A1* | 3/2013 | Kawasaki | H02J 7/0027 320/101 |
| 2013/0288096 A1* | 10/2013 | Frutschy | H01M 2/1088 429/99 |
| 2013/0330609 A1 | 12/2013 | Sawa et al. | |
| 2014/0327336 A1* | 11/2014 | Ewert | H02K 3/522 310/215 |
| 2015/0061571 A1* | 3/2015 | Lin | H02J 7/0044 320/107 |
| 2015/0325818 A1* | 11/2015 | Suzuki | H01M 2/1061 429/159 |
| 2016/0111897 A1* | 4/2016 | Yang | H02J 7/0042 307/66 |

FOREIGN PATENT DOCUMENTS

| | | |
|---|---|---|
| TW | I 381293 B | 1/2013 |
| WO | WO 2012/108270 A1 | 8/2012 |

* cited by examiner

CHARGE CABINET AND STORAGE DEVICE THEREOF

CROSS-REFERENCE TO RELATED APPLICATIONS

This non-provisional application claims priority under 35 U.S.C. § 119(a) on Patent Application No(s). 104139705 filed in Taiwan on Nov. 27, 2015, the entire contents of which are hereby incorporated by reference.

TECHNICAL FIELD

The present disclosure provides a storage device and a charge cabinet, more particularly to a storage device having a wire management structure and a charge cabinet having the storage device.

BACKGROUND

Since mobile electronic devices have many advantages such as being highly portable, simple to operate, highly entertaining, excellent extension capabilities and excellent display capabilities, many education institutions use mobile electronic devices as multimedia devices for educating students. Generally, educational institutions purchase the mobile electronic devices and the charging cabinets at the same time. The charging cabinet is used for storing and charging the mobile electronic devices.

SUMMARY

According to the disclosure, a storage device includes a base and a plurality of wire management modules. Each of the wire management modules includes a partition and a pivotal member. The partition is disposed to the base and has a supporting surface and a wire management groove. The supporting surface is located at a side of the partition away from the base. The wire management groove is located at the supporting surface, and the wire management groove is for accommodating wire. The pivotal member includes a fastening part and a pivotal part connected to each other. The pivotal part is pivoted on the partition, and the pivot member has a fastening position and a releasing position. When the pivotal member is at the fastening position, the fastening part covers a part of the supporting surface for fastening a part of wire between the supporting surface and the fastening part. When the pivotal member is at the releasing position, the fastening part is spaced apart from the supporting surface for releasing wire. The partitions of the plurality of wire management modules and the base together form a plurality of accommodation spaces.

According to the disclosure, a charge cabinet includes a case, a power supply, a plurality of wires and the aforementioned storage device. The power supply is disposed to the case. The wires are electrically connected to the power supply. The storage device is disposed in the case.

BRIEF DESCRIPTION OF THE DRAWINGS

The present invention will become more understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
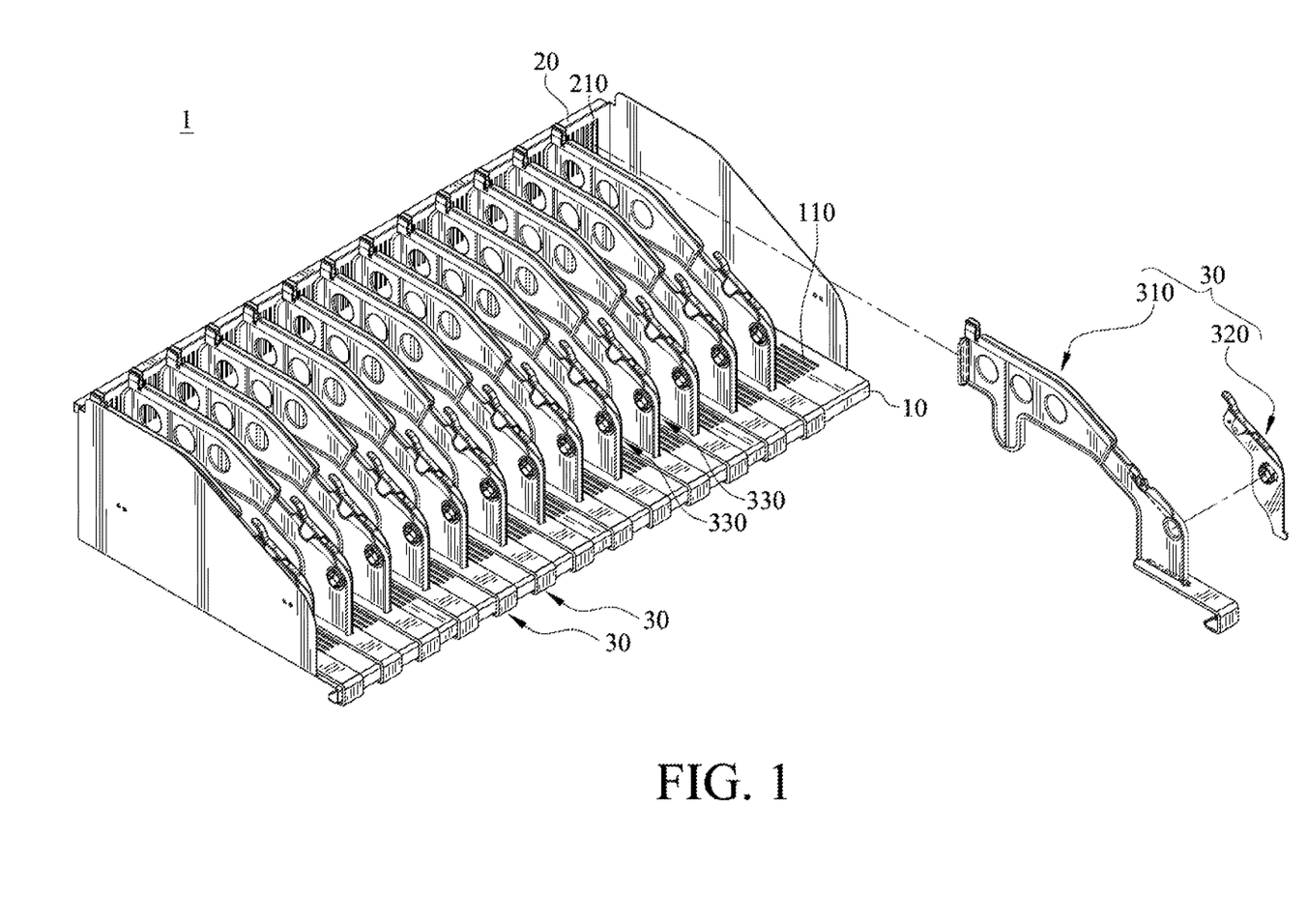
FIG. 1 is an exploded view of a storage device according to a first embodiment.
Figure 2:
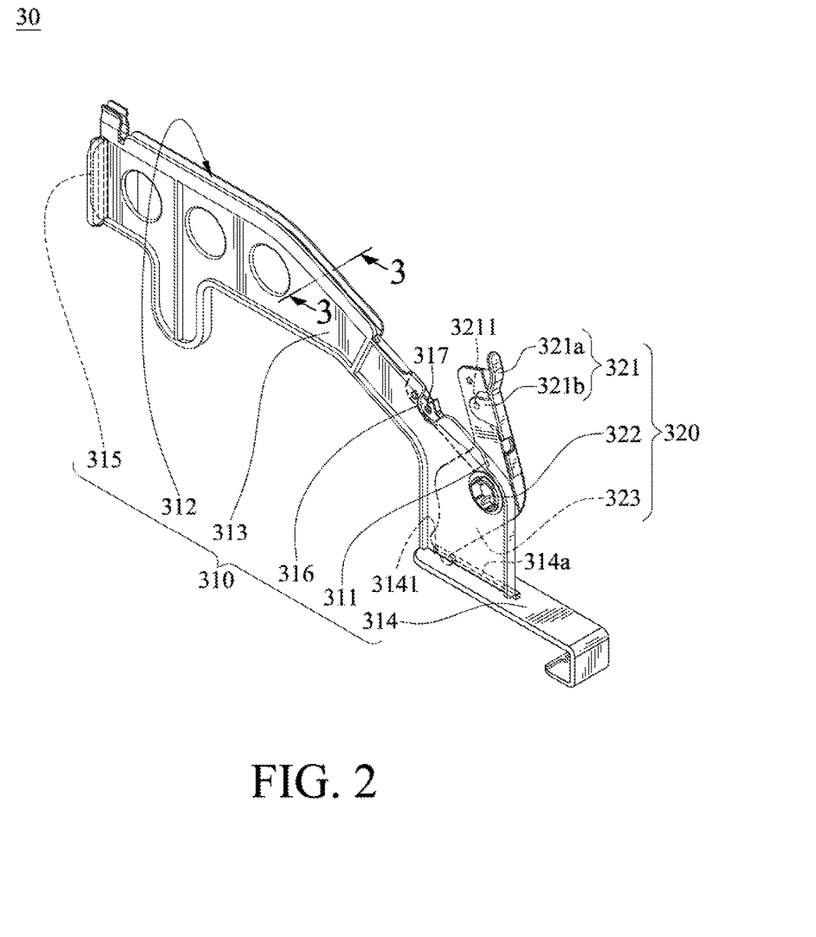
FIG. 2 is a perspective view of the wire management module in FIG. 1.
Figure 3:
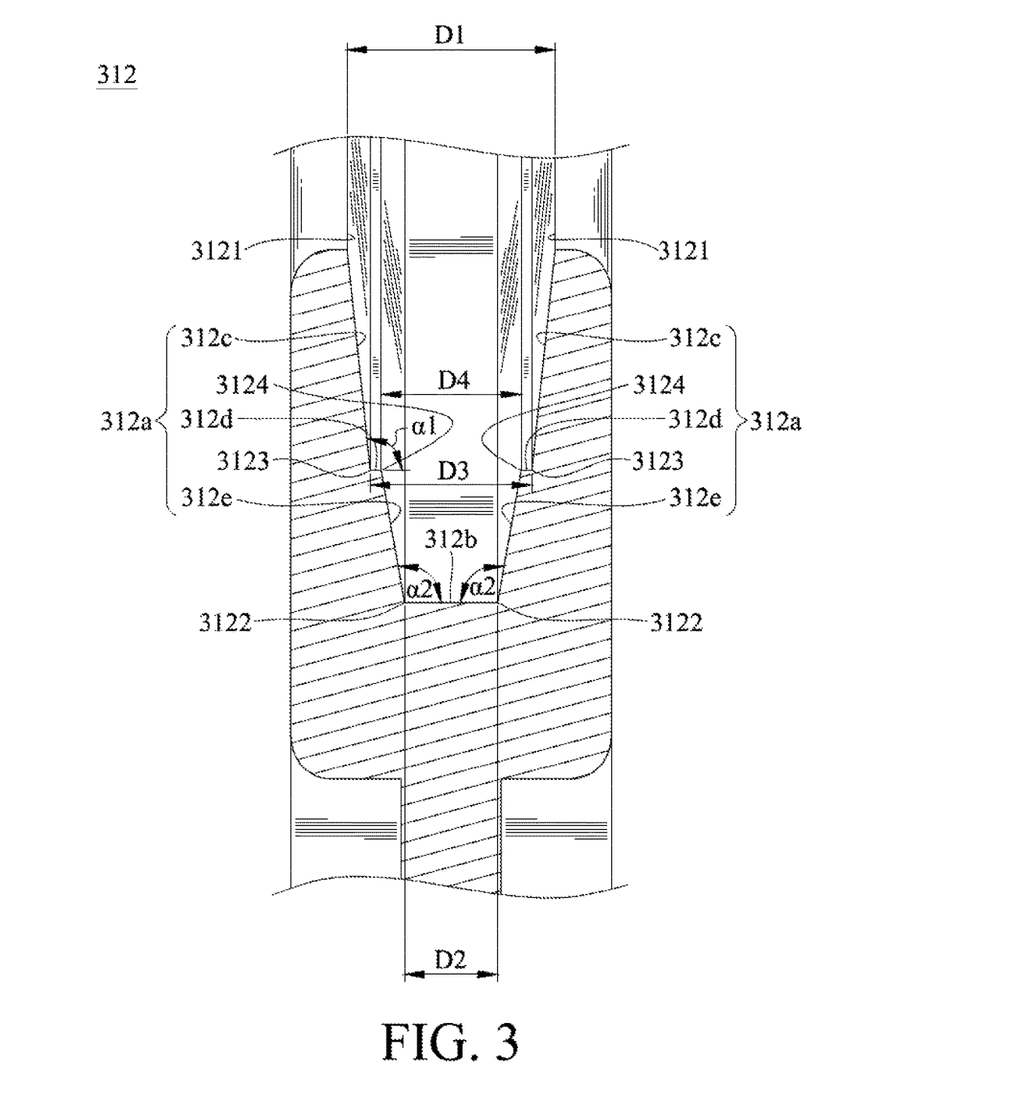
FIG. 3 is a partial cross-sectional view of the wire management module in FIG. 2 along a line 3-3.
Figure 4:
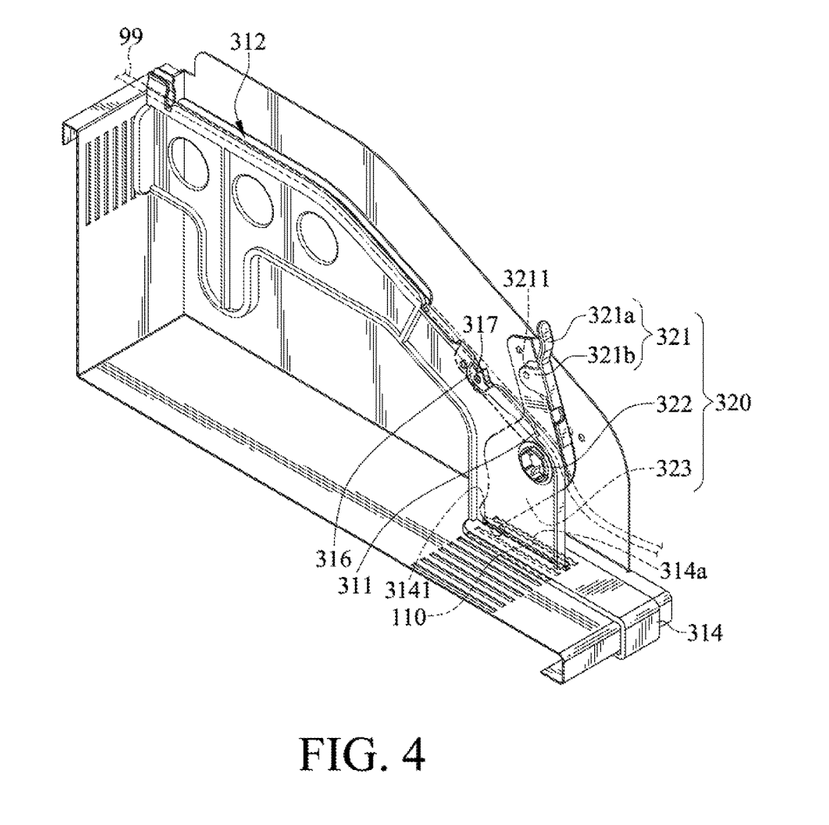
FIG. 4 is a perspective view of the wire management module in FIG. 1 with a pivotal member at a releasing position.
Figure 5:
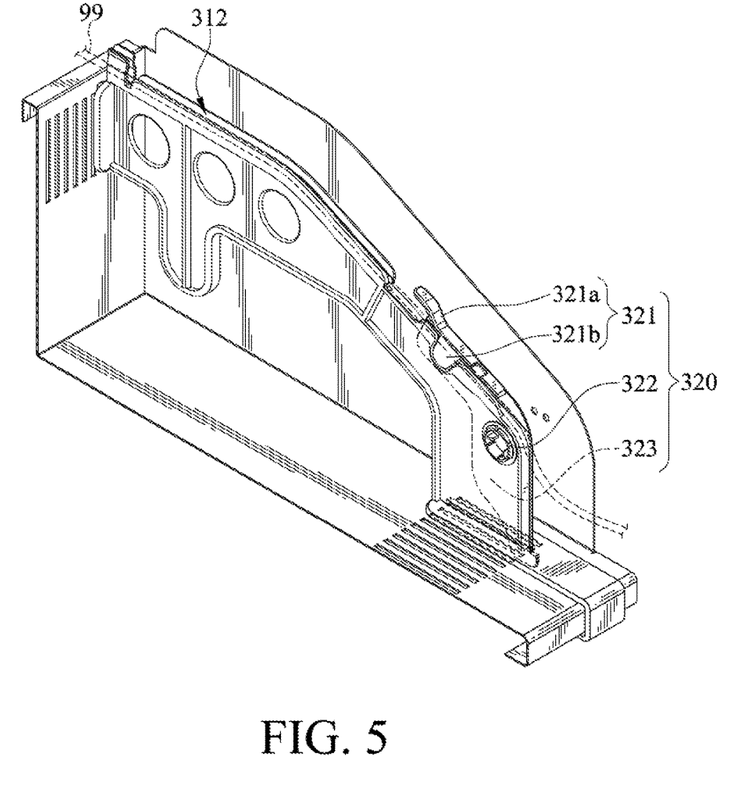
FIG. 5 is a perspective view of the wire management module in FIG. 4 with the pivotal member at a fastening position.

Please refer to FIG. 1 to FIG. 5. FIG. 1 is an exploded view of a storage device according to a first embodiment. FIG. 2 is a perspective view of the wire management module in FIG. 1. FIG. 3 is a partial cross-sectional view of the wire management module in FIG. 2 along a line 3-3. FIG. 4 is a perspective view of the wire management module in FIG. 1 with a pivotal member at a releasing position. FIG. 5 is a perspective view of the wire management module in FIG. 4 with the pivotal member at a fastening position. In this embodiment, the storage device 1 includes a base 10, a board 20 and a plurality of wire management modules 30.

The base 10, for example, can be a frame made of metal or plastic, and the base 10 can have a plurality of slits 110. The board 20 stands on the base 10, and the board 20 can have a plurality of fastening holes 210.

Each of the wire management modules 30 includes a partition 310 and a pivotal member 320. The partition 310 is disposed to the base 10. The partitions 310 of the wire management modules 30 and the base 10 together form a plurality of accommodation spaces 330. Each of the accommodation spaces 330 can be used for accommodating a mobile electronic device such as a tablet, laptop or a smart phone. Each of the partitions 310 has a supporting surface 311 and a wire management groove 312 for accommodating a wire. The supporting surface 311 is located at a side of the partition 310 away from the base 10, and the wire management groove 312 is located at the supporting surface 311. In this embodiment, both the supporting surface 311 and the wire management groove 312 are located at the top of the partition 310 for obtaining a larger accommodation space 330, but the disclosure is not limited thereto. In other embodiments, both the supporting surface and the wire management groove can be located at a side of the partition facing the accommodation space. Furthermore, the wire management groove 312 is formed on a part of the supporting surface 311 in this embodiment, but the disclosure is not limited thereto. In other embodiments, the wire management groove can be formed on all parts of the supporting surface 311.

The wire management groove 312 has two side surfaces 312a opposite to each other and a bottom surface 312b. Each of the two side surfaces 312a has a first edge 3121 and a second edge 3122 that are opposite to each other. The two second edges 3122 are respectively connected to two opposite sides of the bottom surface 312b. The distance D2 between the two second edges 3122 can be less than the distance D1 between the two first edges 3121. In detail, each of the two side surfaces 312a can have a first limiting section 312c, a supporting section 312d and a second limiting section 312e which may be connected in sequence. The supporting section 312d is located between the first limiting section 312c and the second limiting section 312e. The first edge 3121 is the edge of the first limiting section 312c away from the supporting section 312d, and the second edge 3122 is the edge of the second limiting section 312e away from the supporting section 312d. The supporting section 312d has a side 3123 close to the first limiting section 312c and a side 3124 close to the second limiting section 312e. The distance D3 between the two sides 3123 can be greater than the distance D4 between the two sides 3124. Therefore, a space formed by the two first limiting sections 312c and the two supporting sections 312d is favorable for accommodating the wire having larger diameter, and a space formed by the two second limiting sections 312e and the bottom surface 312b is favorable for accommodating the wire having a smaller diameter, and thereby the wire management groove 312 is applicable to accommodate different wires having different diameters. For example, the wire management groove 312 can accommodate two wires having different diameters simultaneously or can alternatively accommodate one of the two wires.

The wire management modules 30 are detachably disposed to the base 10 and the board 20. In detail, the partition 310 of the wire management module 30 can include a partitioning member 313, an assembling member 314 and a protrusion 315. The assembling member 314 and the protrusion 315 are connected by the partitioning member 313. Both the supporting surface 311 and the wire management groove 312 are located at the partitioning member 313, and the pivotal member 320 is pivoted on the partitioning member 313. The assembling member 314 is detachably assembled together with an edge of the base 10 away from the board 20, and the protrusion 315 is detachably fastened into the fastening hole 210. Therefore, two different ends of the wire management module 30 are respectively fixed to the base 10 and the board 20 by the assembling member 314 and the protrusion 315.

The pivotal member 320 includes a fastening part 321 and a pivotal part 322 connected to each other, and the pivotal part 322 is pivoted on the partition 310. The pivotal member 320 is rotatable relative to the partition 310 and has a releasing position and a fastening position. Therefore, the wire management groove 312 and the pivotal member 320 are used for positioning and managing the wire. As shown in FIG. 4, when the pivotal member 320 is at the releasing position, the fastening part 321 of the pivotal member 320 is spaced apart from the supporting surface 311 of the partition 310. A user is capable of positioning a wire 99 in or removing the wire 99 from the wire management groove 312. In detail, the wire 99 can be pulled along the supporting surface 311 so as to be positioned into the wire management groove 312, or the wire 99 can be disposed to the supporting surface 311 and into the wire management groove 312 from the top of the partition 310. The wire 99 may be used for charging the electronic device disposed in the accommodation space 330 of the storage device 1.

The pivotal member 320 is rotatable relative to the partition 310 so as to move from the releasing position to the fastening position. As shown in FIG. 5, the fastening part 321 of the pivotal member 320 is close to the partition 310 so as to cover a part of the supporting surface 311 when the pivotal member 320 is at the fastening position. Thus, a part of wire 99 is fastened between the fastening part 321 and the supporting surface 311 of the partition 310. In detail, as shown in FIG. 2, the partition 310 can further have an accommodation groove 316 and a positioning hole 317 that are connected to each other. The fastening part 321 of the pivotal member 320 can include a fastening section 321a and a positioning section 321b that are connected to each other. The positioning section 321b extends towards the partition 310, and the positioning section 321b can include a fixing block 3211. When the pivotal member 320 is at the fastening position, a part of the positioning section 321b is located in the accommodation groove 316, and the fixing block 3211 faces the partition 310 and is fastened in the positioning hole 317 so as to keep the pivotal member 320 at the fastening position. The fastening section 321a abuts against the wire 99 so that the wire is securely attached to the supporting surface 311. Therefore, the arrangement of the fixing block 3211 and the positioning hole 317 is favorable for preventing the pivotal member 320 from being away from the fastening position so as to maintain sufficient capability for fastening the wire 99. Moreover, the positioning section 321b is favorable for preventing any deviation between the fastening section 321a and the supporting surface 311 so as to ensure that the pivotal member 320 at the fastening position is properly fasten the wire 99 between the fastening section 321a and the supporting surface 311.

When it is necessary to release the wire 99, the pivotal member 320 is moved from the fastening position to the releasing position. Therefore, the fastening part 321 is away from the supporting surface 311 so that the wire 99 is movable relative to the partition 310, and thereby the user is able to adjust a length of the wire 99 or replace the wire 99 with another wire having a different diameter.

According to the disclosure, a part of the wire 99 is disposed in the wire management groove 312, and a part of the wire 99 is fastened between the pivotal member 320 and the supporting surface 311 of the partition 310. Thus, the position of the wire 99 on the wire management module 30 is fixed by the wire management groove 312 and the pivotal member 320, thereby preventing the wires 99 from becoming tangled and being difficult to plug into the port of the mobile electronic device.

Furthermore, as shown in FIG. 3, the first limiting section 312c and the supporting section 312d of the side surface 312a may have an obtuse angle $\alpha 1$ therebetween, and the second limiting section 312e and the bottom surface 312b may have an obtuse angle $\alpha 2$ therebetween. Therefore, the first limiting section 312c and the second limiting section 312e tilt in relation to the bottom surface 312b whereby a wire may easily be accommodated into the wire management groove 312 from such a larger opening at the top of the wire management groove 312, and may get into position between the two first limiting sections 312c or the two second limiting sections 312e.

In addition, the assembling member 314 of the partition 310 can have a through hole 314a, and the assembling member 314 can further have a blocking section 3141 located at an edge of the through hole 314a close to the board 20. The pivotal member 320 can further include an extension part 323, and the pivotal part 322 of the pivotal member 320 is located between the fastening part 321 and the extension part 323. The extension part 323 is movably disposed in the through hole 314a, and the extension part 323 is separatably abutted against the blocking section 3141 so as to keep the pivotal member 320 at the releasing position. In detail, when the pivotal member 320 is moved from the fastening position to the releasing position, the extension part 323 is abutted against the blocking section 3141 so as to stop the rotation of the pivotal member 320 relative to the partition 310. Thus, the arrangement of the blocking section 3141 and the extension part 323 is favorable for maintaining an angle between the pivotal member 320 and the base 10 when the pivotal member 320 is at the releasing position so that the angles between each of the pivotal members 320 and the base 10 are the same, and thereby it is favorable for providing better overall appearance of the storage device 1. Moreover, the pivotal member 320 is capable of being kept at the releasing position by the blocking section 3141 and the extension part 323 without supported by hand so that the user is able to replace and organize the wire on the supporting surface 311 with two hands. In this embodiment, the extension part 223 can extend into the slit 110 for increasing the area of the extension part 223 abutted against the blocking section 3141.

Figure 6:
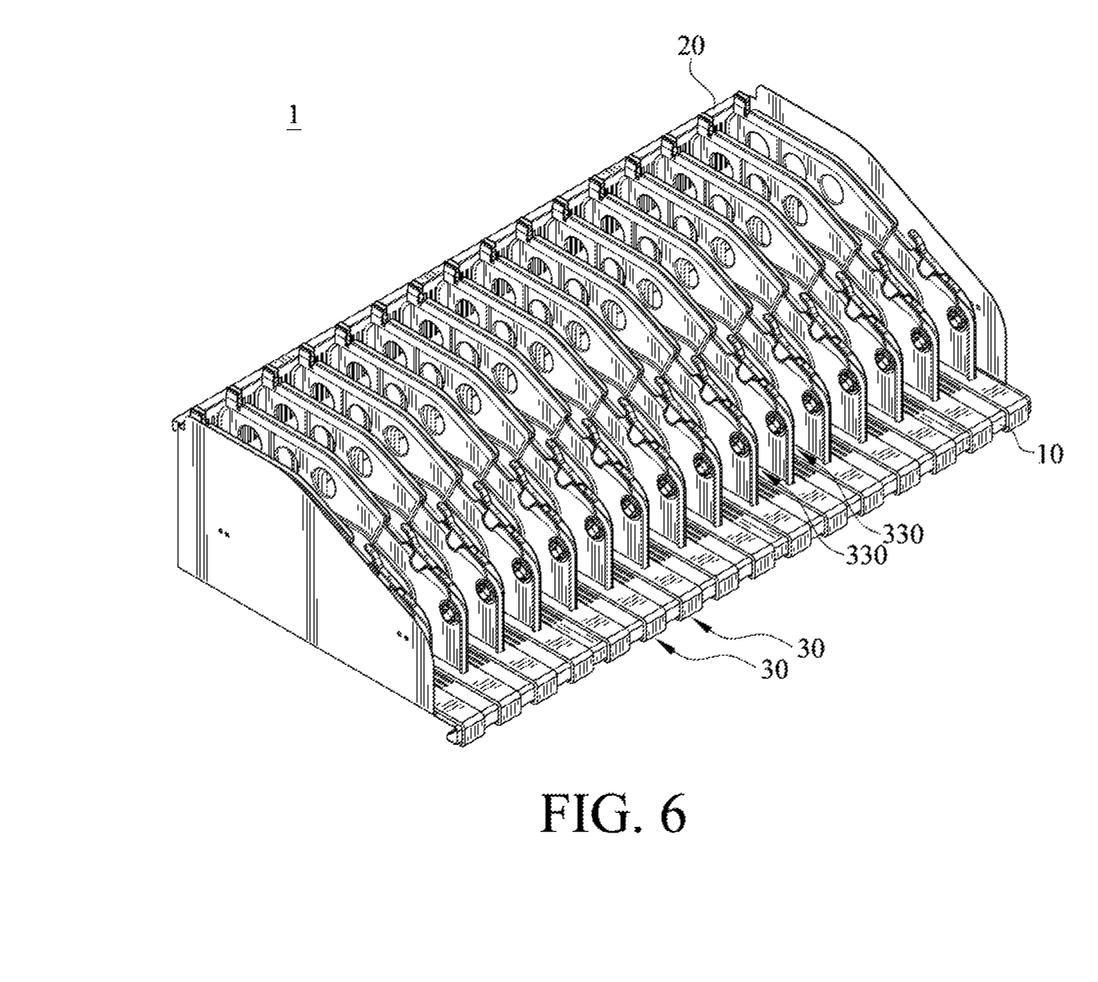
FIG. 6 is a perspective view of the storage device in FIG. 1 with different a quantity of the wire management module.
Figure 7:
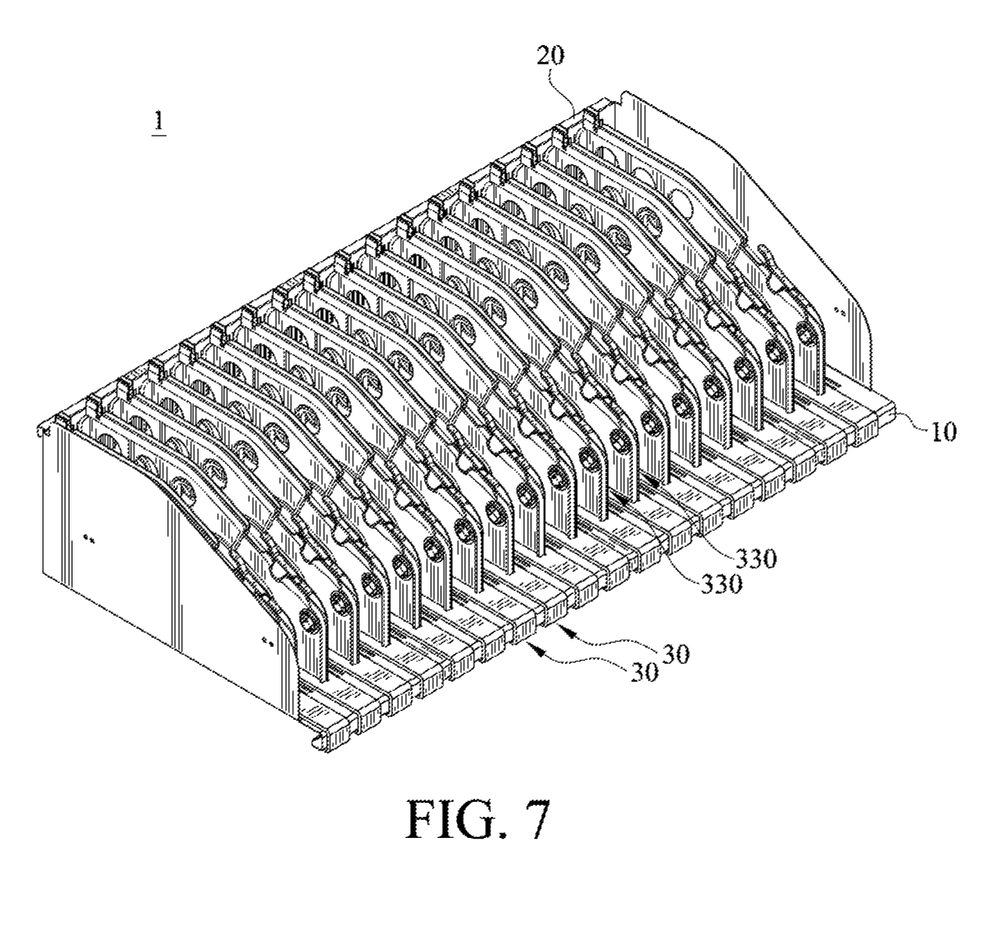
FIG. 7 is a perspective view of the storage device in FIG. 1 with another different quantity of the wire management module.

In this embodiment, the wire management modules 30 are detachably assembled together with the base 10 and the board 20 so that the distance between every two of the wire management modules 30 that are adjacent to each other is adjustable, and the quantity of the wire management module 30 assembled together with the base 10 and the board 20 is also adjustable. Please refer to FIG. 1, FIG. 6 and FIG. 7. FIG. 6 is a perspective view of a storage device in FIG. 1 with different quantity of the wire management module; FIG. 7 is a perspective view of a storage device in FIG. 1 with another different quantity of the wire management module. In FIG. 1, the storage device 1 includes totally thirteen wire management modules 30 so as to form a total of thirteen accommodation spaces 330. When it is necessary to adjust the distance between two adjacent wire management modules 30 or the quantity of the wire management modules 30, some of the management modules 30 or all of the wire management modules 30 are detached from the base 10 and the board 20, and the necessary quantity or distance is decided by the user. Then, the user assembles the wire management modules 30, the base 10 and the board 20 together according to the necessary quantity or distance decided. For example, in FIG. 6, the storage device 1 includes a total of fifteen wire management modules 30 so as to form a total of fifteen accommodation spaces 330, and each of the accommodation spaces 330 is narrower for accommodating thinner electronic devices. In FIG. 7, the storage device 1 includes a total of eighteen wire management modules 30 so as to form a total of eighteen accommodation spaces 330. In this embodiment, the wire management module 30 is detachable from the base 10 and the board 20, but the disclosure is not limited thereto. In other embodiments, the wire management module can be secured to the base and the board (undetachable from the base and the board). In some embodiments, the storage device can include the base without including the board, and the wire management module is detachably or undetachably disposed to the base.

Figure 8:
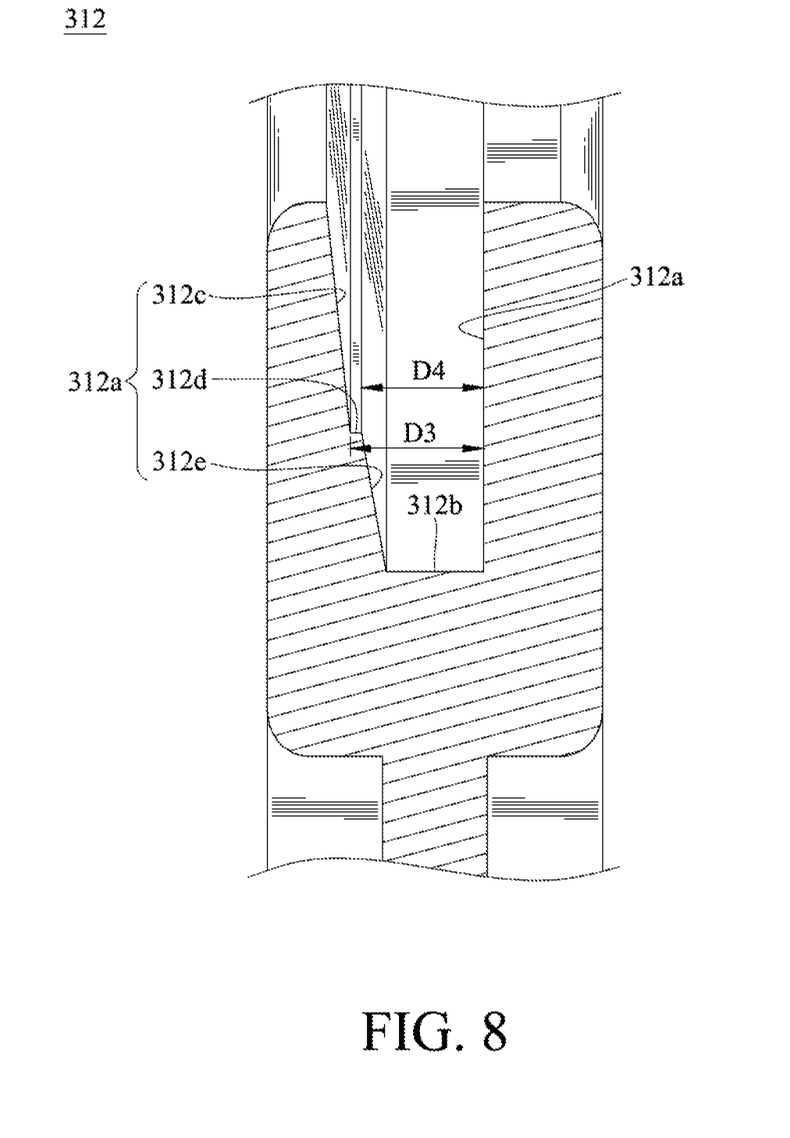
FIG. 8 is a partial cross-sectional view of a storage device according to a second embodiment.

In the first embodiment, both of the two side surfaces of the wire management groove has the limiting sections and the supporting section, but the disclosure is not limited thereto. Please refer to FIG. 8. FIG. 8 is a partial cross-sectional view of a storage device according to a second embodiment. Since the second embodiment is similar to the first embodiment, only the differences will be illustrated hereafter.

In this embodiment, one of the two side surfaces 312a of the wire management groove 312 has the first limiting section 312c, the supporting section 312d and the second limiting section 312e, and the other side surface 312a is smooth. The distance D3 from the side of the supporting section 312d close to the first limiting section 312c to the smooth side surface 312a is greater than the distance D4 from the side of the supporting section 312d close to the second limiting section 312e to the smooth side surface 312a. Therefore, a space formed by the first limiting section 312c, the supporting section 312d and the smooth side surface 312a is favorable for accommodating the wire having a larger diameter, and a space formed by the second limiting section 312e, the bottom surface 312b and the smooth side surface 312a is favorable for accommodating the wire having a smaller diameter.

Figure 9:
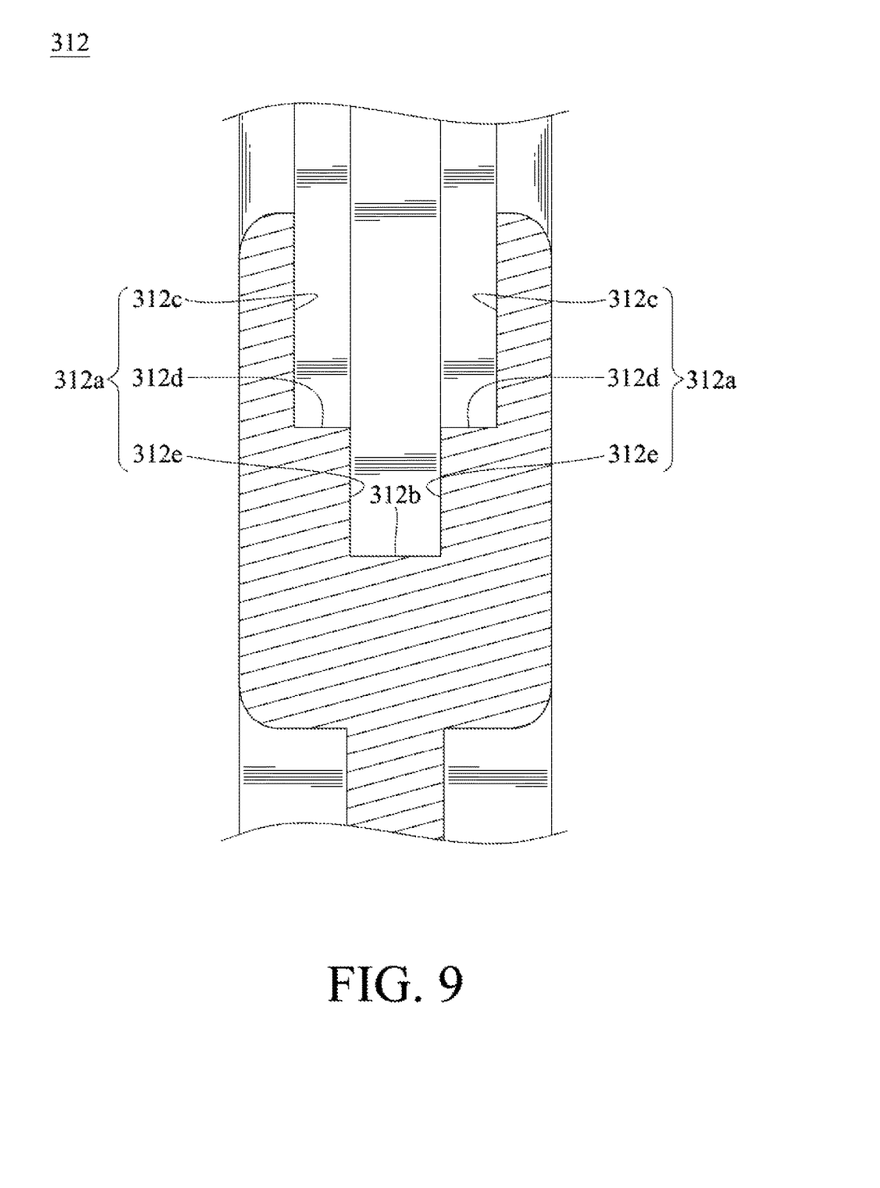
FIG. 9 is a partial cross-sectional view of a storage device according to a third embodiment.

In the first embodiment, there are the obtuse angles between the first limiting section 312c and the supporting section 312d as well as the second limiting section 312e and the bottom surface 312b of the side surface in the wire management groove 312, but the disclosure is not limited thereto. Please refer to FIG. 9. FIG. 9 is a partial cross-sectional view of a storage device according to a third embodiment. Since the third embodiment is similar to the first embodiment, only the differences will be illustrated hereafter. In this embodiment, there is a right angle between the first limiting section 312c and the supporting section 312d, and there is also a right angle between the second limiting section 312e and the bottom surface 312b. That is, the limiting sections 312c, 312e of the side surface 312a are perpendicular to the supporting section 312d and the bottom surface 312b.

Figure 10:
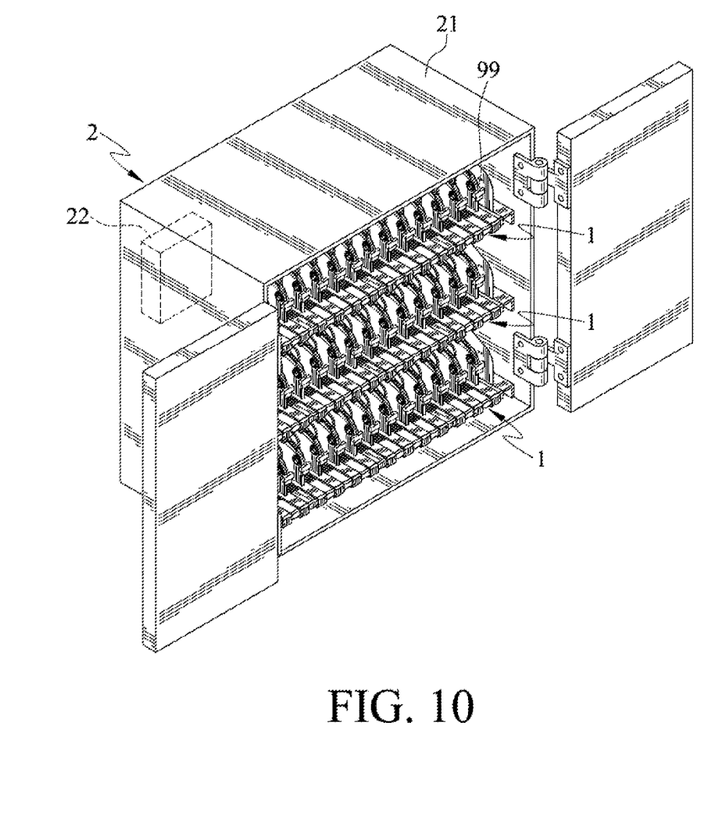
FIG. 10 is a perspective view of a charge cabinet according to a fourth embodiment.

The storage device may be applicable to a charge cabinet. Please refer to FIG. 10. FIG. 10 is a perspective view of a charge cabinet according to a fourth embodiment. In this embodiment, the charge cabinet 2 includes at least one storage device 1 according to one of the embodiment of the disclosure, a case 21, a power supply 22 and a plurality of wires 99. The case 21, for example, is a frame of the charge cabinet 2. The power supply 22 may be disposed on an outer surface of the case 21 or disposed in the case 21. Two ends of the wires 99 may be respectively electrically connected to the power supply 22 and a port of an electronic device (not shown in the drawing). The storage device 1 may be disposed in the case 21. The wire 99, for example, is a cable for charging the electronic device disposed in the accommodation space of the storage device 1. The base and the board of the storage device 1 can be integrated formed with the case 21 as a single member.

According to the disclosure, the wire management groove formed on the partition so that it is favorable for positioning the wire at a one side of the partition. After the wire is accommodated in the wire management groove, the pivotal member is rotatable for fastening the wire between the supporting surface of the partition and the fastening part of the pivotal member. Therefore, the position of the wire on the partition is fixed, and thereby preventing the wire from becoming tangled and being difficult to plug into the port of the mobile electronic device.

Furthermore, a space formed by the first limiting section and the supporting section is favorable for accommodating the wire having larger diameter, and a space formed by the second limiting section and the bottom surface is favorable for accommodating the wire having a smaller diameter, and thereby the wire management groove is applicable to accommodate different wires having different diameters.

Moreover, the assembling member of the partition is detachably assembled together with the base, and the protrusion of the partition is detachably fastened into the fastening hole of the board. Two different ends of the wire management module are respectively fixed to the base and the board by the assembling member and the protrusion. Therefore, the distance between every two of the wire management modules that are adjacent to each other is adjustable, and the quantity of the wire management module assembled together with the base and the board is also adjustable.

In addition, when the pivotal member is moved from the fastening position to the releasing position, the extension part is abutted against the blocking section so as to stop the rotation of the pivotal member relative to the partition. Thus, the arrangement of the blocking section and the extension part is favorable for maintaining an angle between the pivotal member and the base when the pivotal member is at the releasing position so that the angles between each of the pivotal members and the base are the same, and thereby it is favorable for providing better overall appearance of the storage device. Moreover, the pivotal member is capable of being kept at the releasing position by the blocking section and the extension part without supported by hand so that the user is able to replace and organize the wire on the supporting surface with two hands.

In addition, the arrangement of the fixing block and the positioning hole is favorable for preventing the pivotal member from being move away from the fastening position so as to maintain sufficient capability for fastening the wire.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A storage device, comprising:
    a base; and
    a plurality of wire management modules, each of the plurality of wire management modules comprising:
        a partition disposed to the base and having a supporting surface and a wire management groove at a side of the partition away from the base, the wire management groove located at the supporting surface, and the wire management groove being for accommodating a wire; and
        a pivotal member comprising a fastening part and a pivotal part connected to each other, the pivotal part pivoted on the partition to be at either a fastening position or a releasing position; when the pivotal member being at the fastening position, the fastening part covering a part of the supporting surface for fastening a part of the wire between the supporting surface and the fastening part; when the pivotal member being at the releasing position, the fastening part being spaced apart from the supporting surface for releasing the wire;
    wherein the partitions of the plurality of wire management modules and the base jointly form a plurality of accommodation spaces.

2. The storage device according to claim 1, wherein the wire management groove has two side surfaces and a bottom surface, each of the two side surfaces has a first edge and a second edge that are opposite to each other, the two second edges of the two side surfaces are respectively connected to two sides of the bottom surface that are opposite to each other, and a distance between the two second edges is less than a distance between the two first edges.

3. The storage device according to claim 2, wherein at least one of the two side surfaces has a first limiting section, a supporting section and a second limiting section, the supporting section is located between the first limiting section and the second limiting section, a distance between a side of the supporting section close to the first limiting section and the other one of the two side surfaces is greater than a distance between a side of the supporting section close to the second limiting section and the other one of the two side surfaces.

4. The storage device according to claim 3, wherein each of the two side surfaces has the first limiting section, the supporting section and the second limiting section.

5. The storage device according to claim 1, wherein the partition comprises a partitioning member and an assembling member connected to each other, the supporting surface is located at the partitioning member, the pivotal member is pivoted on the partitioning member, and the assembling member is detachably assembled together with the base.

6. The storage device according to claim 5, wherein the assembling member has a blocking section, the pivotal member further comprises an extension part, the pivotal part of the pivotal member is located between the fastening part and the extension part, the extension part of the pivotal member is separately abutted against the blocking section of the assembling member for keeping the pivotal member at the releasing position.

7. The storage device according to claim 6, wherein the assembling member further has a through hole, the blocking section is located at an edge of the through hole, and the extension part of the pivotal member is movably located in the through hole.

8. The storage device according to claim 1, further comprising a board standing on the base, wherein the board has a plurality of fastening holes, each of the partitions comprises a partitioning member and a protrusion connected to each other, the supporting surface is located at the partitioning member, the pivotal member is pivoted on the partitioning member, and the protrusion is detachably fastened into the fastening hole.

9. The storage device according to claim 1, wherein the partition further has an accommodation groove and a positioning hole, the fastening part of the pivotal member comprises a fastening section and a positioning section connected to each other, the accommodation groove of the partition is located at the supporting surface, the fastening section of the pivotal member is for fastening the wire, and the positioning section of the pivotal member extends towards the partition and comprises a fixing block; when the pivotal member is at the fastening position, a part of the positioning section is located in the accommodation groove, and the fixing block on the positioning section faces the partition and is fastened into the positioning hole for keeping the pivotal member at the fastening position.

10. A charge cabinet, comprising:
a case;
a power supply disposed to the case;
the storage device according to claim 1, disposed to the case; and
the wires electrically connected to the power supply.

11. The charge cabinet according to claim 10, wherein the wire management groove has two side surfaces and a bottom surface, each of the two side surfaces has a first edge and a second edge that are opposite to each other, the two second edges of the two side surfaces are respectively connected to two sides of the bottom surface that are opposite to each other, and a distance between the two second edges is less than a distance between the two first edges.

12. The charge cabinet according to claim 11, wherein at least one of the two side surfaces has a first limiting section, a supporting section and a second limiting section, the supporting section is located between the first limiting section and the second limiting section, a distance between a side of the supporting section close to the first limiting section and the other one of the two side surfaces is greater than a distance between a side of the supporting section close to the second limiting section and the other one of the two side surfaces.

13. The charge cabinet according to claim 12, wherein each of the two side surfaces has the first limiting section, the supporting section and the second limiting section.

14. The charge cabinet according to claim 10, wherein the partition comprises a partitioning member and an assembling member connected to each other, the supporting surface is located at the partitioning member, the pivotal member is pivoted on the partitioning member, and the assembling member is detachably assembled together with the base.

15. The charge cabinet according to claim 14, wherein the assembling member has a blocking section, the pivotal member further comprises an extension part, the pivotal part of the pivotal member is located between the fastening part and the extension part, the extension part of the pivotal member is separately abutted against the blocking section of the assembling member for keeping the pivotal member at the releasing position.

16. The charge cabinet according to claim 15, wherein the assembling member further has a through hole, the blocking section is located at an edge of the through hole, and the extension part of the pivotal member is movably located in the through hole.

17. The charge cabinet according to claim 10, further comprising a board standing on the base, wherein the board has a plurality of fastening holes, each of the partitions comprises a partitioning member and a protrusion connected to each other, the supporting surface is located at the partitioning member, the pivotal member is pivoted on the partitioning member, and the protrusion is detachably fastened into the fastening hole.

18. The charge cabinet according to claim 10, wherein the partition further has an accommodation groove and a positioning hole, the fastening part of the pivotal member comprises a fastening section and a positioning section connected to each other, the accommodation groove of the partition is located at the supporting surface, the fastening section of the pivotal member is for fastening wire, and the positioning section of the pivotal member extends towards the partition and comprises a fixing block; when the pivotal member is at the fastening position, a part of the positioning section is located in the accommodation groove, and the fixing block on the positioning section faces the partition and is fastened into the positioning hole for keeping the pivotal member at the fastening position.

* * * * *